US007013323B1

(12) United States Patent
Thomas et al.

(10) Patent No.: US 7,013,323 B1
(45) Date of Patent: *Mar. 14, 2006

(54) SYSTEM AND METHOD FOR DEVELOPING AND INTERPRETING E-COMMERCE METRICS BY UTILIZING A LIST OF RULES WHEREIN EACH RULE CONTAIN AT LEAST ONE OF ENTITY-SPECIFIC CRITERIA

(75) Inventors: Jason B. Thomas, Arlington, VA (US); Mark J. Bildner, Alexandria, VA (US); Brandy M. Thomas, Arlington, VA (US); Christopher D. Young, Washington, DC (US); Richard P. Moore, Potomac Falls, VA (US); Ross A. Biro, Alexandria, VA (US); Alissa S. Pemberton, Washington, DC (US); Diane B. Perlman, Silver Spring, MD (US)

(73) Assignee: Cyveillance, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/576,896

(22) Filed: May 23, 2000

(51) Int. Cl.
*G06F 15/16* (2006.01)

(52) U.S. Cl. .................. 709/203; 709/224; 709/219; 707/4; 707/5; 707/6; 707/7; 707/10

(58) Field of Classification Search ............... 709/218, 709/223, 224, 203, 217, 219; 707/1, 3–7, 707/10
See application file for complete search history.

(56) References Cited

U.S. PATENT DOCUMENTS

| 5,659,732 | A | * | 8/1997 | Kirsch | 707/5 |
| 5,931,907 | A | * | 8/1999 | Davies et al. | 709/218 |
| 5,933,822 | A | * | 8/1999 | Braden-Harder et al. | 707/5 |
| 5,963,965 | A | * | 10/1999 | Vogel | 715/501.1 |
| 6,289,341 | B1 | * | 9/2001 | Barney | 707/6 |
| 6,321,228 | B1 | * | 11/2001 | Crandall et al. | 707/10 |
| 6,377,961 | B1 | * | 4/2002 | Ryu | 707/7 |
| 6,442,606 | B1 | * | 8/2002 | Subbaroyan et al. | 709/224 |
| 6,480,835 | B1 | * | 11/2002 | Light | 707/3 |
| 6,480,837 | B1 | * | 11/2002 | Dutta | 707/3 |
| 6,519,586 | B1 | * | 2/2003 | Anick et al. | 707/3 |
| 2001/0044795 | A1 | * | 11/2001 | Cohen et al. | 707/5 |
| 2002/0147880 | A1 | * | 10/2002 | Wang Baldonado | 711/1 |
| 2002/0169694 | A1 | * | 11/2002 | Stone et al. | 705/27 |
| 2003/0149684 | A1 | * | 8/2003 | Brown et al. | 707/1 |

* cited by examiner

*Primary Examiner*—Saleh Najjar
*Assistant Examiner*—Oanh Duong
(74) *Attorney, Agent, or Firm*—DLA Piper Rudnick Gray Cary US LLP

(57) ABSTRACT

A system, method and computer program product for developing and interpreting e-commerce metrics is disclosed. The method involves collecting pages that are commonly transmitted over a computer network (e.g., the Internet, an institutional intranet, etc.), where the pages are relevant to the business operations of an entity, collecting external data, which may or may not be available on the computer network, but that is highly relevant to the entity, processing the collected pages with additional information such as contact information, routing tables, financial information, and other data which does not need to be collected more than once, and scoring the pages based on all the information collected to determine statistics. The statistics are analyzed for business information which may be important to the operations of the entity. The method then produces a report to deliver a continuous stream of e-commerce intelligence for the entity.

19 Claims, 13 Drawing Sheets

Score Words

| NONCE 604 | WORD 606 | VERSION 608 | COMMENT 610 | EDIT 612 | ATTRUBUTES 614 | | |
|---|---|---|---|---|---|---|---|
| | | | | | | | |
| | | | | | | | |
| SHOW DEBUG INFO 616 | | RESET 618 | SUBMIT 620 | | | | |
| SCORE NAME 622 | | PRIMARY PAGE SCORE 626 | BOOST POINTS 628 (optional) | | | | |
| | | | | | | | |
| | | | | | | | |

Score Formula — 702

| NONCE 704 | FORMULA 706 | VERSION 708 | OPERATIONAL-ORDER 710 | COMMENT 712 | EDIT 714 |
|---|---|---|---|---|---|
|  |  |  |  |  |  |
|  |  |  |  |  |  |

Edit Formula

| ADD 716 | MODIFY 718 | DELETE 720 | ACTIVE 722 | FUNCTIONS 724 | E-TYPES 726 | MIME TYPES 728 | TOP-LEVEL DOMAIN TYPES 730 |
|---|---|---|---|---|---|---|---|
|  |  |  |  |  |  |  |  |
|  |  |  |  |  |  |  |  |

INPUT BOX 732

ATTRIBUTES 734

FIG. 7

Global Score Words & Groups 802

| NONCE 808 | WORDS 804 | | | GROUPS 806 | |
|---|---|---|---|---|---|
| | VERSION 810 | ATTRIBUTES 812 | NONCE 814 | VERSION 816 | ATTRIBUTES 818 |
| | | | | | |
| | | | ... | | |
| | | | | | |

Global Score Formula 803

| NONCE 820 | VERSION 822 | OPERATION-ORDER 824 | COMMENT 826 | EDIT 828 | ATTRIBUTES 830 |
|---|---|---|---|---|---|
| | | | | | |
| | | | | | |
| | | | | | |

FIG. 8A

| Score word 854 | Nonce 858 | Version 860 | Comment 862 | Human Readable 864 | Full Word (optional) 866 |
|---|---|---|---|---|---|
| Add a Word... 856 | Case Sensitive (optional) 868 | Regular Expression (optional) 870 | RegEx Help (optional) 872 | RegEx Translation (optional) 874 | |

Attributes 830

FIG. 8B

| Executive Summary 1002 | Site Analysis 1004 | Trending 1008 | Help 1010 |
|---|---|---|---|
| Key Findings 1012 | | Important Sites 1014 | |
| - Entity's Products<br>- Trade of Entity's Products<br>- Retailers<br>- Trademark Abusers<br>- Gripe Sites about entity's product<br>1016 | | - URL<br>- URL<br>- URL<br>- URL<br>- URL<br>1018 | |

FIG. 10

SYSTEM AND METHOD FOR DEVELOPING AND INTERPRETING E-COMMERCE METRICS BY UTILIZING A LIST OF RULES WHEREIN EACH RULE CONTAIN AT LEAST ONE OF ENTITY-SPECIFIC CRITERIA

CROSS-REFERENCE TO RELATED APPLICATION

This application is related to the following commonly owned, co-pending applications:

"System, Method and Computer Program Product for an Online Monitoring Search Engine", by Thomas, having application Ser. No. 09/133,374, filed on Aug. 13, 1998, which is incorporated herein by reference in its entirety; and "System, Method and Computer Program Product for Analyzing E-Commerce Competition", by Thomas et al., having application number TBA Ser. No. 09/576,895, filed concurrently herewith, which is incorporated herein by reference in it entirety.

BACKGROUND OF THE INVENTION

1. Field of the Invention

The invention relates generally to computer network search engines, and more particularly to search engines for performing online monitoring activities.

2. Related Art

Over the past several years, there has been a large growth in the number of computers, and thus people, connected to the global Internet and the World-Wide Web (WWW). This collective expansion allows computer users to access various types of information, disseminate information, and be exposed to electronic commerce (e-commerce) activities, all with a great degree of freedom. E-commerce includes large corporations, small businesses, individual entrepreneurs, organizations, and the like who offer their information, products, and/or services to people all over the world via the Internet.

The rise in use of the Internet, however, also has a negative side. Given the Internet's vastness and freedom, many unscrupulous companies, organizations and individuals have taken the opportunity to profit by diverting customer traffic, misusing product information, and mis-associating their product or company with others. For example, it has been estimated that millions of pages employ tags and text designed to divert searchers to their sites when the Internet users actually searched for something else. These diversions and incidents of misinformation cause a loss of business. Also, an individual, company, organization, or the like may be concerned with other violations such as the illegal sale of their products, or the sale of inferior products using their brand names. Furthermore, an individual, a company, an organization, or the like may be concerned with false information (i.e., "rumors") that originate and spread quickly over the Internet, resulting in the disparagement of the entity. Such entities may also be interested in gathering data about how they and their products and/or services are perceived on the Internet (i.e., a form of market research).

In order to compete with the above-described aspects of the Internet, entities are currently forced to search Internet resources (i.e., Web sites, File Transfer Protocol (FTP) sites, newsgroups, chat rooms, etc.), by visiting over thousands of sites in order to discern activities relevant to their business operations. Such searching is currently done either by hand or using commercial search engines. Each of these methods is costly because a great amount of time is required to do such searching—time that detracts from positive, profit-earning activities. Adding to the frustration of discerning relevant activity is the fact that commercial search engines are updated infrequently and typically limit the resulting number of sites (i.e., "hits") that any given search request returns. Furthermore, the task of visiting each site to determine whether there is indeed relevant activity and if so, the extent and character of it, also demands a great deal of time.

Therefore, in view of the above, what is needed is a system, method and computer program product for developing and interpreting e-commerce metrics. Such e-commerce metrics can provide relevant market information and feedback to an entity so that it may detect and prioritize its online business efforts. Further, what is needed is a system, method and computer program product that searches the Internet's vast resources for data relevant to the entity's activities and its associates and produces a detailed, customized report of relevant activity affecting the entity.

SUMMARY OF THE INVENTION

The invention is directed to a system, method and computer program product for developing and interpreting e-commerce metrics that meets the identified needs. The method and computer program product involve collecting documents that are commonly transmitted over a computer network (e.g., the Internet, an institutional intranet, etc.), where the documents are relevant to the business operations of an entity. The method and computer program product also collect external data, which may or may not be available on the computer network, but that is highly relevant to the entity. A list of predetermined, entity-specific criteria is obtained from the external data. A list of rules is generated, where each rule contains at least one of the entity-specific criteria. The method and computer program product determine whether any of the collected pages satisfies any of the listed rules. Matching pages are gathered into a subset for further processing. Additional information is added to the subset of pages. The additional information can be contact information, routing tables, financial information, and other data which does not need to be collected more than once.

The method and computer program product score the pages based on all the information collected to determine statistics. The statistics are analyzed for business information which may be important to the operations of the entity. The method and computer program product then produce a report to deliver a continuous stream of e-commerce intelligence for the entity. Depending on the entity-specific criteria, the method and computer program product can determine and report whether others are diverting entity's buyers or computer network traffic by using metatags and other browser magnets; selling or distributing the entity's goods without authorization; using or misusing the entity's intellectual property; claiming false affiliations with the entity; associating the entity with objectionable material, such as hate sites or other rogue sites, or with pornographic content; or engaging in other relevant activity affecting the entity or its goodwill. The method and computer program product can also be used to help identify potential partners, affiliates and other sources of unrealized revenue and to identify newsgroup commentary that may be impacting the entity's reputation and/or value.

The e-commerce metrics system of the invention includes a downloader for searching a computer network (e.g., the Internet), a page processing module for receiving the pages downloaded from the search of the computer network, the page processing module forming a list of pages. In one embodiment, the system contains numerous downloaders for searching the entire computer network, searching specific locations, and searching specific formats (e.g., newsgroups or chat sites). The system also contains an archive for storing the listed pages, the pages being downloaded to the archive by the page processing module, and a database for allowing the page processing module to perform higher order operations on the pages on the list in order to produce a report to be utilized by users of the system. Entities use the system to search for information about themselves or other entities. In one embodiment, the system also includes a plurality of Internet clients (e.g., Web, e-mail, Wireless Application Protocol (WAP), etc.) that provide a graphical user interface (GUI) for users to enter search criteria, communicate with the downloader and page processing module, and view pages with scoring information, entity statistics, and page contents.

One advantage of the invention is that users may quickly and efficiently search and find relevant information contained on Web, FTP, and File Service Protocol (F SP) sites, as well as chat rooms and newsgroups within the Internet.

Another advantage of the invention is that detailed and customizable reports listing overall statistics and associated metrics are produced allowing entities to focus their business efforts.

Another advantage of the invention is that its back-end (page processing module) and front-end (user interface) are designed to operate independently of each other, thus allowing greater throughput and availability of the system as a whole.

Yet another advantage of the invention is that lists of relevant pages may be grouped and prioritized, both in an automated and manual fashion, in order to arrive at a manageable set of data.

Further features and advantages of the invention as well as the structure and operation of various embodiments of the invention are described in de-tail below with reference to the accompanying drawings.

BRIEF DESCRIPTION OF THE FIGURES

The accompanying drawings, which are incorporated herein and form a part of the specification, illustrate the invention and, together with the description, further serve to explain the principles of the invention and to enable a person skilled in the pertinent art(s) to make and use the invention.

In the drawings:

FIGS. 6, 7, 8A and 8B are exemplary scoring input pages according to an embodiment of the invention;

FIGS. 9 and 10 are exemplary output report pages according to an embodiment of the invention.

The invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Table of Contents

I. Overview
II. System Architecture
III. Software Architecture
IV. Overall E-Commerce Metrics System Operation
V. Graphical User Interface (Front-End)
VI. Page Processing Module (Back-End)
VII. Output Reports
VIII. Front-End and Back-End Severability
IX. Environment
X. Conclusion I. Overview The present invention is directed to a system, method, and computer program product for developing and interpreting e-commerce metrics. In one embodiment of the invention, users are entities who are interested in maximizing their return on investment and e-commerce objectives with a continuous stream of relevant market feedback from the Internet. Such entities can employ an intelligent search engine that spans the entirety of the Internet's vast resources and returns links to Internet sites that, with a high probability of certainty, contain relevant information affecting the entity. The input of the system's search engine can be customized for each entity based on, for example, their products, services, business activity, and/or the types of intellectual property owned. The system's search engine can also provide detailed reports, customized to fit each entity's monitoring needs, so that the entity's personnel may prioritize their activities. In one embodiment, the system also provides a Web server so that entities may remotely utilize the search engine.

While the invention is described in terms of the above example, this is for convenience only and is not intended to limit its application. In fact, after reading the following description, it will be apparent to one skilled in the relevant art(s) how to implement the following invention in alternative embodiments (e.g., providing online monitoring for a corporate intranet or extranet).

Furthermore, while the following description focuses on the monitoring of Web sites, newsgroups, and FTP sites, and thus employs such terms as Universal Resource Locators (URLs), address, Web pages, and content, it is not intended to limit the application of the invention. It will be apparent to one skilled in the relevant art(s) based on the teachings contained herein how to implement the following invention, where appropriate, in alternative embodiments. For example, the invention may be applied to monitoring chat rooms, forums, or mailing lists, etc.

II. System Architecture

Figure 1A:
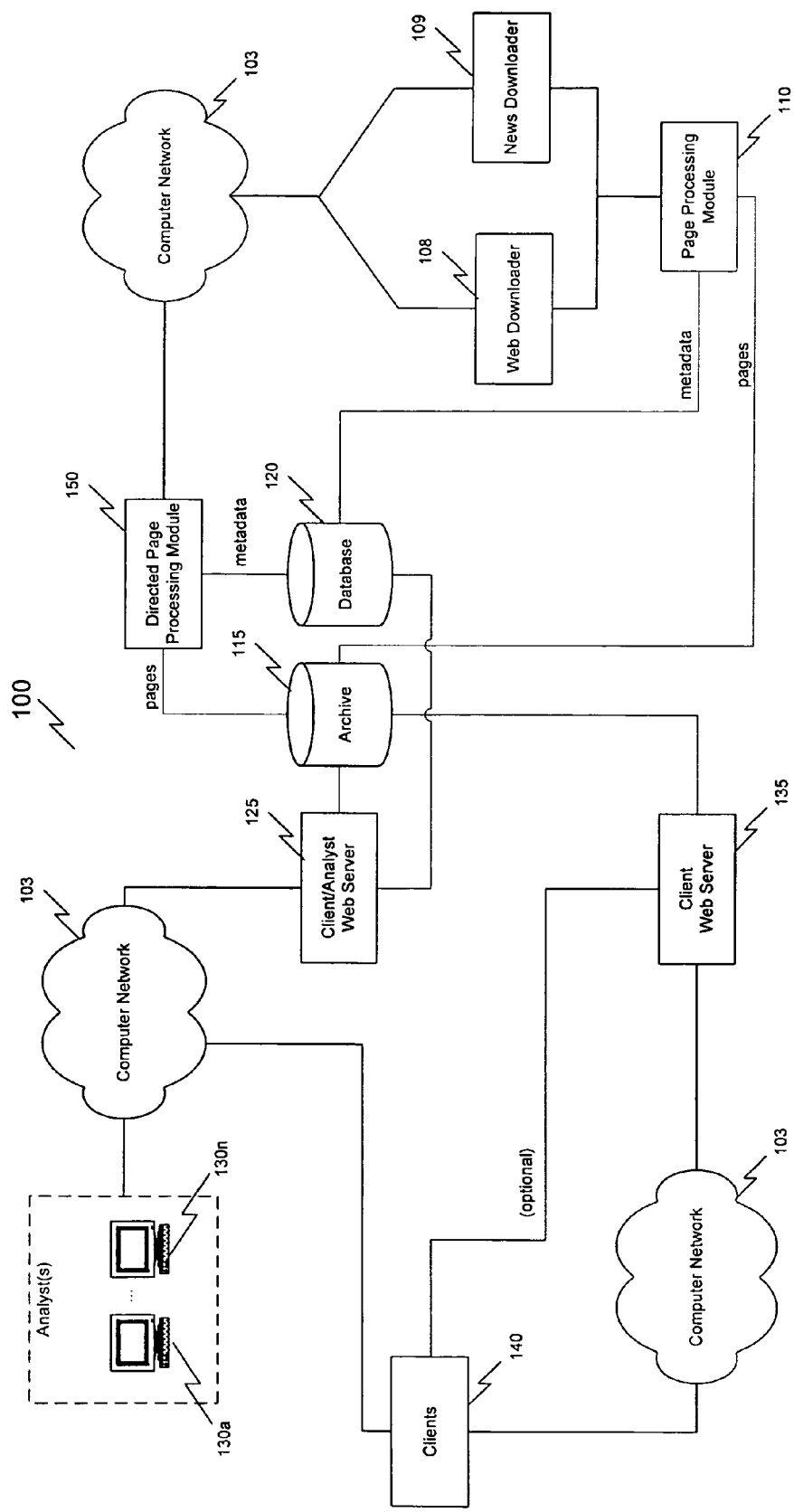
FIG. 1A is a block diagram illustrating the system architecture of an embodiment of the invention, showing network connectivity among the various components.
Figure 1B:
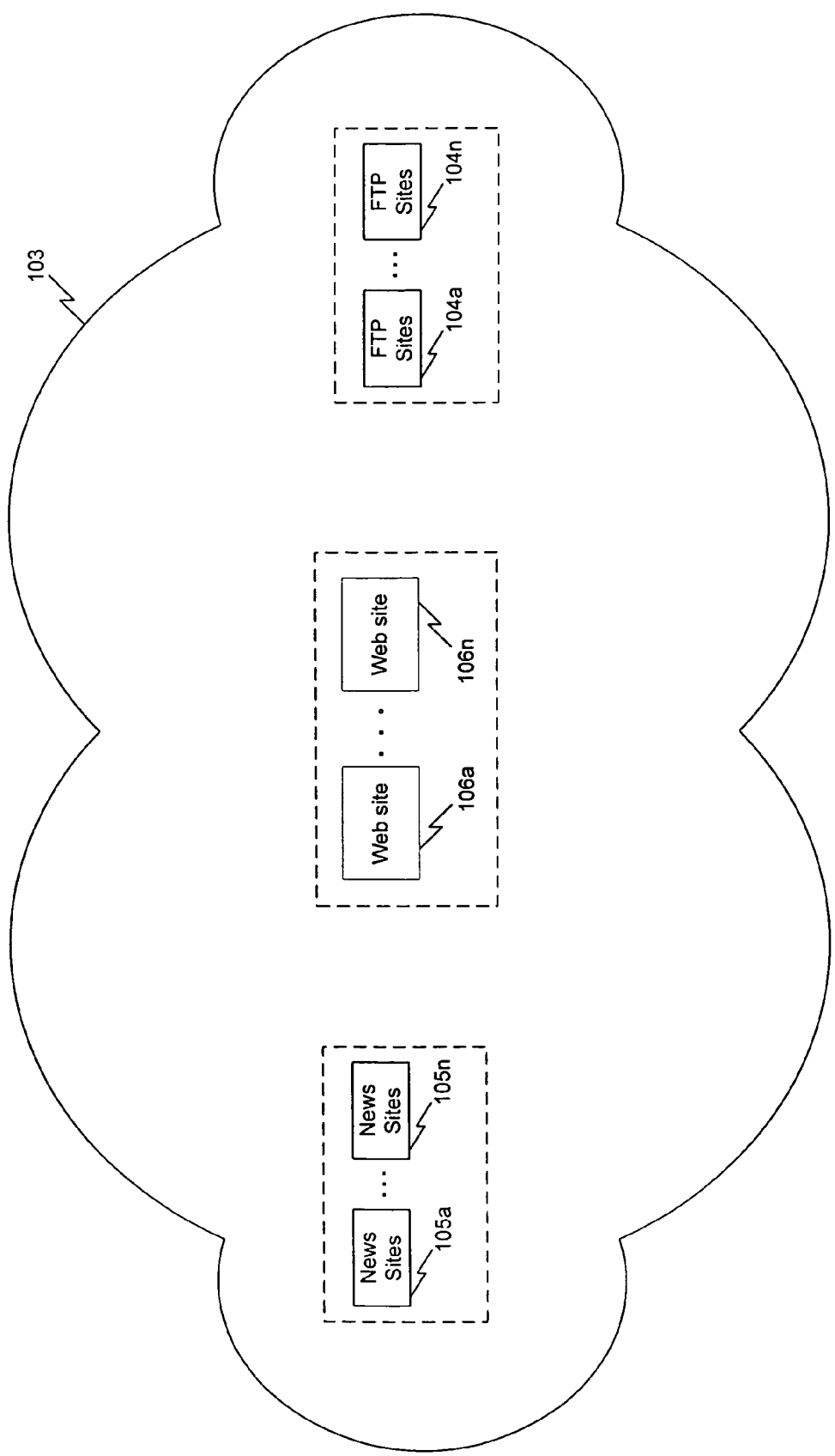
FIG. 1B is a block diagram illustrating the global Internet, showing the different components which may be present.

Referring to FIG. 1A, a block diagram illustrating the physical architecture of a e-commerce metrics system TOO, according to an embodiment of the invention, showing the network connectivity among the various components is shown. It should be understood that the particular e-commerce metrics system 100 in FIG. 1A is shown for illustrative purposes only and does not limit the invention. As will be apparent to one skilled in the relevant art(s) based at least on the teachings described herein, all of components "inside" (not shown) of the e-commerce metrics system 100 are connected directly or via to computer network 103.

The e-commerce metrics system 100 includes a Web downloader 108 and news downloader 109. These downloaders are configured according to the nature of the pages that they search. The system includes a page processing module 110 that serves as the "back-end" of the invention. Page processing module 110 connects to the downloaders 108 and 109 to receive downloaded pages. Connected to the page processing module 110, is a database 120 and an archive 115. Page processing module 110 performs various counting and scoring operations on the downloaded pages and forwards the resulting metadata to database 120. Metadata includes various high order results from processing the data contained on collected pages. For example, the total number of pages containing links to a certain Web site, and/or an average of the number of external links on each Web page on a Web site. Complete copies of the pages are stored on archive 115.

In one embodiment of the invention, directed page processing module 150 gathers pages from specific locations on computer network 103. Thus, directed page processing module 150 contains control logic similar to downloaders 108, 109 and page processing module 110, but only as necessary for limited (specific) page retrieval. Directed page processing module 150 forwards these pages to archive 115 after processing the information on the downloaded pages. Similarly, metadata generated from the downloaded pages is sent to database 120.

Client/analyst Web server 125 provides clients 140 and analysts 130 with access to the metadata stored in database 120 and the pages stored in archive 1115. Analysts 130 are users of the invention who can review the metadata and pages and alter the focus of the searches conducted by the downloaders 108, 109, and directed page processing module 150. This feedback measure allows the invention to fully cover areas of the computer network 103 which contain desired information. Client Web server 135 is connected to archive 115. Client Web server 135 provides clients 140 with access to the stored pages used to develop metadata, which forms the bases for conclusions arrived at by the invention by the scoring processes of the present invention.

As is well-known in the relevant art(s), a Web server is a server process running at a Web site which sends out Web pages in response to Hypertext Transfer Protocol (HTTP) requests from remote browsers. The Web servers 125 and 135 serve as "front ends" of the invention. That is, the Web servers 125 and 135 provide the graphical user interface (GUI) to users of the e-commerce metrics system 100 in the form of Web pages. Such users may access Web servers 125 and 135 either directly or via a connection to computer network 103 (e.g., the Internet).

While only one database 120, archive 115, page processing module 110, and directed page processing module 150 are shown in FIG. 1A, it will be apparent to one skilled in the relevant art(s) that e-commerce metrics system 100 may be run in a distributed fashion over a plurality of the above-mentioned network elements connected via computer network 103. For example, both the page processing module 110 "back-end" application and the Web servers 125 and 135 "front-end" may be distributed over several computers thereby increasing the overall execution speed and/or reliability of the e-commerce metrics system 100. More detailed descriptions of the e-commerce metrics system 100 components, as well their functionality, are provided below.

Referring to FIG. 11B, the global Internet depicted by computer network 103, includes a plurality of various FTP sites 104 (shown as sites 104*a–n*) and the WWW is shown. Within the WWW are a plurality of Web sites 106 (shown as sites 106*a–n*). The search space for the page processing module 1110 includes the Web sites 106 and the plurality of FTP sites 104. Within the Usenet are a plurality of newsgroups 105. As mentioned above, it will be apparent to one skilled in the relevant art(s), that the search space (i.e., computer network 103) of the e-commerce metrics system 100, although not shown, will also include chat rooms, mailing lists, FSP sites, etc.

As will be apparent to one skilled in the relevant art(s), audio-visual content can be parsed for analysis by using technologies such as optical character recognition (OCR) and/or watermark technologies.

III. Software Architecture

Figure 2:
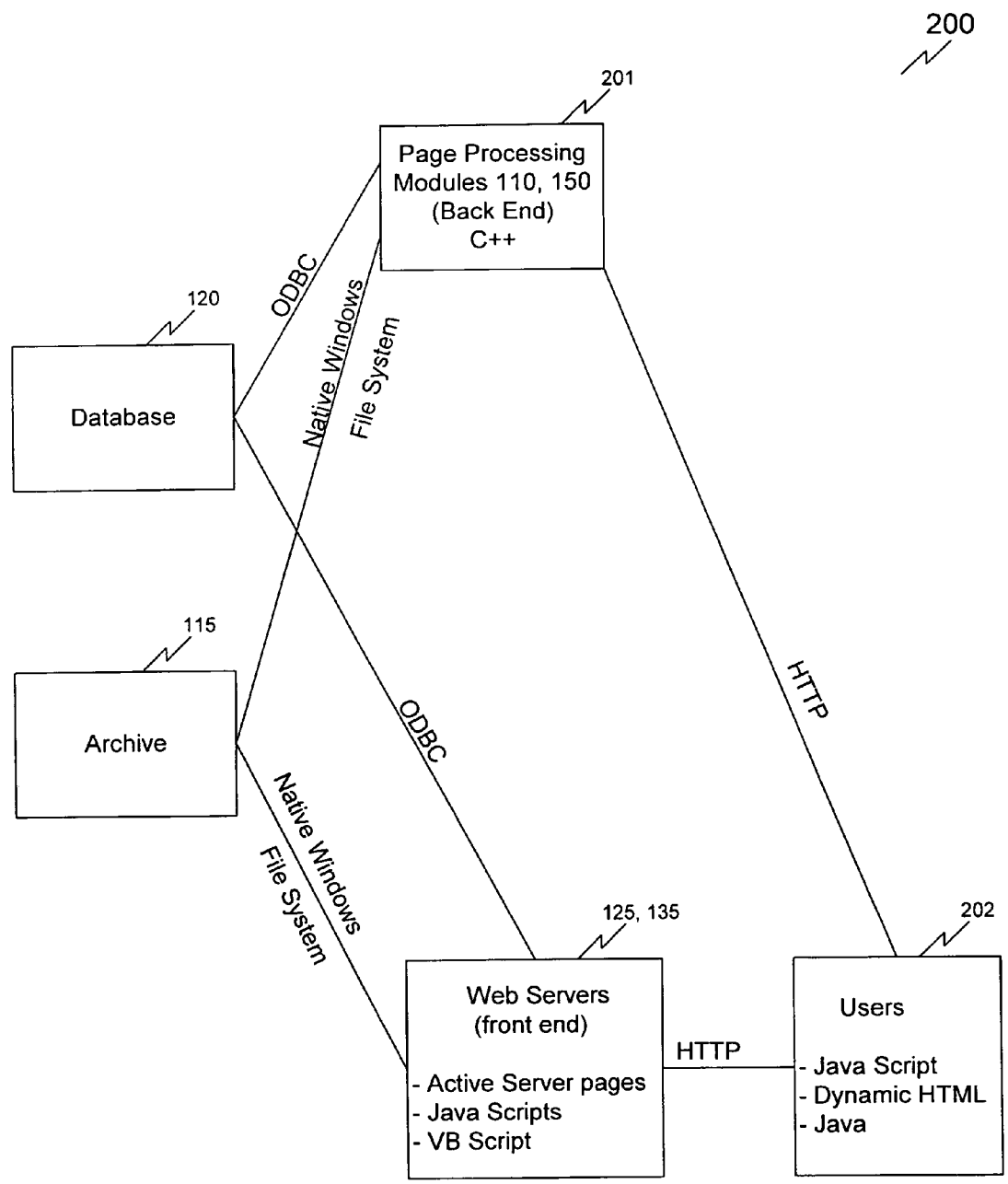
FIG. 2 is a block diagram illustrating the software architecture of an embodiment of the invention, showing communications among the various components.

Referring to FIG. 2, a block diagram illustrating a software architecture 200 according to an embodiment of e-commerce metrics system 100, showing communications among the various components, is shown. The software architecture 200 of e-commerce metrics system 100 includes software code that implements the page processing module 110 and directed page processing module 150 (hereinafter "processing modules 201I") in a high level programming language such as the C++ programming language. Further, in an embodiment, the processing modules 201 software code is an application running on an IBM™ (or compatible) personal computer (PC) in the Windows NT™ operating system environment.

In one embodiment of the invention, the database 120 is implemented using a high-end relational database product (e.g., Microsoft™ SQL Server, IBM™ DB2, ORACLE™, INGRES™, etc.). As is well-known in the relevant art(s), relational databases allow the definition of data structures, storage and retrieval operations, and integrity constraints, where data and relations between them are organized in tables.

In one embodiment of the invention, the processing modules 201 application communicates with the database 120 using the Open Database Connectivity (ODBC) interface. As is well-known in the relevant art(s), ODBC is a standard for accessing different database systems from high level programming language application. It enables these, applications to submit statements to ODBC using an ODBC structured query language (SQL) and then translates these to the particular SQL commands the underlying database product employs.

The archive 115, in one embodiment of the invention, is any physical memory device that includes a storage media and a cache (e.g., the hard drive and primary cache, respectively, of the same PC that runs the page processing module 110 application). In an alternative embodiment, the archive 115 may be a memory device external to the PC hosting the processing modules 201 application. In yet another alternative embodiment, the archive 115 may encompass a storage media physically separate from the cache, where the storage media may also be distributed over several elements within connected to the computer network. Further, in one embodiment of the invention, the archive 1115 communicates with the processing modules 201 application and Web servers 125, and 135 using the operating system's native file commands (e.g., Windows NT™).

The Web servers 125, and 135 provide the GUI "front-end" for e-commerce metrics system 100. In one embodiment of the invention, it is implemented using the Active Server Pages (ASP), Visual BASIC (TB) script, Extensible Mark-up Language (XML), and JavaScript™ sever-side scripting environments that allow the creation of dynamic Web pages. The Web servers 125 and 135 communicate with the plurality of clients 140 and analysts 130 (hereinafter, collectively shown as "users 202") using HTTP. The users 202 employ a browser (or other GUI) using Java, JavaScript™, and Dynamic Hypertext Markup Language (DHTML). In one embodiment, users can connect to e-commerce metrics system 100 via a WAP phone or facsimile machine. In an embodiment of the invention, as will be described in detail below in Section VIII, users 202 may also communicate directly with the processing modules 201 application via HTTP.

IV E-Commerce Metrics System

Figure 3:
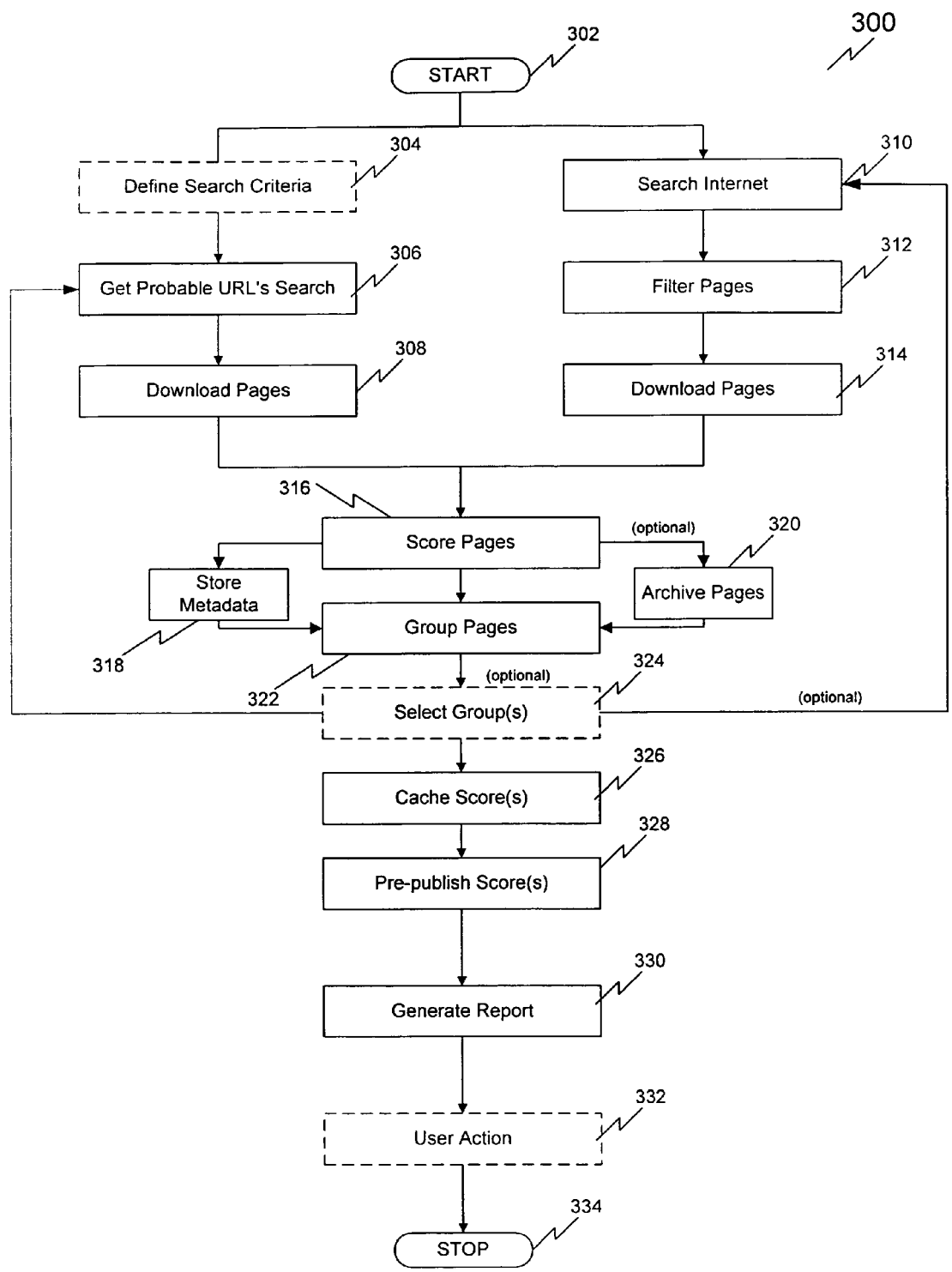
FIG. 3 is a flowchart showing the overall operation of an embodiment of the invention.

Referring to FIG. 3, a flowchart 300 showing the overall operation of the e-commerce metrics system 100, according to an embodiment of the invention, is shown. Flowchart 300 begins at step 302 with control passing immediately to both steps 304 and 310. Step 304 takes place in the directed page processing module 150. In step 304, a user defines a search criteria. The search criteria, as explained in detail below in Section V, are customized according to a particular user's concerns. In step 306, a search of the computer network 103 is performed. This search returns a list of probable uniform resource locators (URL's). As is well-known in the relevant-art(s), a URL is the standard for specifying the location of an object on the computer network 103. The URL standard addressing scheme is specified as "protocol://hostname" (e.g., "http://www.a_company.com", "ftp://organization/pub/files" or "news:alt.topic"). An URL beginning with "http" specifies a Web site 106, an URL beginning with "ftp" specifies an FTP site 104, and an URL beginning with "nntp" specifies a newsgroup. The probable URL's indicate a first (preliminary) set of locations (i.e., addresses) on the computer network 103, based on the search criteria, where pages containing information relevant to entity's operations may be found. The details of the search in step 306 are described in detail below in Section V.

A separate process is also initiated from step 302. From step 302 control also immediately passes to step 310 in downloaders 108 and 109. The page searching and retrieval process is substantially similar as in steps 306–308. Step 310, however, does not work from a predetermined list of locations or address on computer network 103. Downloaders 108 and 109 download everything available on computer network 103. In step 312, the retrieved pages are filtered for information that is minimally relevant for users 202. Minimally relevant pages are downloaded to page processing module 110 in step 314.

In steps 308 and 314, each of the URLs is visited and the contents downloaded locally to processing modules 201. The aim of the download steps 308 and 314 is so that subsequent processing steps of the e-commerce metrics system 100 may be performed on preserved copies of the visited URL's. This eliminates the need for re-visiting (and thus, re-establishing a connection to) each of the URLs Web sites 106, FTP sites 104, etc. specified by the URLs, thus increasing the overall performance of the e-commerce metrics system 100.

If any of the URLs within the preliminary set contains files, those files may contain potentially relevant material (e.g., a "*.mp3" music file, or a "*.gif" or "*.jpg" image file). This is in contrast to actual text located on a Web page of a particular Web site 106. The files may be located: (1) on a different Web site 106 accessible via a hyperlink on the Web page the e-commerce metrics system 100 is currently accessing; (2) on a different Web page of the same Web site 106 the e-commerce metrics system 100 is currently accessing; or (3) in a different directory of the FTP site 104 than the e-commerce metrics system 100 is currently accessing. In these instances, the e-commerce metrics system 100 employs a Web crawling technique in order to locate the files.

The Web crawling technique of the present invention discussed herein includes the use of URL address variations. After the original URL is visited and the link to the file is identified, the e-commerce metrics system 100 truncates the link URL at the rightmost slash ("/"), thus generating a new link URL. This process is repeated until a reachable domain is generated. This technique takes advantage of the fact that most designers of Web sites 106 allow "default" documents to be returned by their Web servers in response to such URL (via HTTP) requests. An example of the directed page processing module 150 and downloaders 108 and 109 Web crawling technique is shown in Table I below.

TABLE 1

| EXAMPLE OF WEB CRAWLING TECHNIQUE |
| --- |
| Original Web Page URL:<br>    http://www.links-to-interesting-files-all-over-the-net.com<br>Interesting Links Found on the Original Web Page Identified by Search Criteria:<br>    http://www.really-good-music-not-yet-released.com/future-hit.mp3<br>    ftp://www.company-trades-secrets.com/july/tradeseceret.doc<br>Truncated URLs:<br>    http://www.really-good-music-not-yet-released.com/<br>    ftp://www.company-trades-secrets.com/july/<br>    ftp://www.company-trades-secrets.com/ |

For any Web site 106 where the site's server is not currently responding (i.e., "down" or "off-line"), directed page processing module 150 and downloaders 108 and 109 applications, before removing the URL corresponding to the site from the preliminary set, implements a "re-try" timer and mechanism.

When any of the URLs within the preliminary set is an FTP site 104 (or FSP site), the normal steps of visiting and downloading the sites are not practical and thus, not used. Therefore, the invention contemplates a method for "FTP crawling" in order to accomplish steps 308 and 314 for such URLs.

First, the directed page processing module 150 and downloaders 108 and 109 applications attempt to log into the FTP site 104 specified by the URL. As is well known in the relevant art(s), there are two types of FTP sites 104—password protected sites and anonymous sites. If the site 104 is password protected and the password is not published in a reference linked page, it is passed over and the URL is removed from the preliminary set. If the FTP site 104 has a published password, the applications attempt to login using that password. If the FTP site 104 is an anonymous site, the applications attempt to log in. As is well known in the relevant art(s), an anonymous FTP site allows a user to login using a user name such as "ftp" or "anonymous" and then use their electronic mail address as the password.

If a connection can be established, the applications have access to the directory hierarchy containing the publically accessible files (e.g., a "pub" subdirectory). The applications may then "nicely" crawl the relevant portions of the FTP site 104 by mapping the directory structure and then visiting certain directories based on keywords derived from the defined search criteria (steps 306 and 310).

The purpose of nice FTP crawling is to capture the relevant contents of the FTP site 104 as it relates to the entity without burdening the host's resources by crawling the entire FTP site 104. This is especially important due the large size of a typical FTP site 104 (e.g., a university's site or someone entire PC hard disk drive), and due to the lack of crawl restriction standards like the "robots.txt" file commonly found on Web sites 106.

Consider the example where the directed page processing module 150 and downloaders 108 and 109 are searching the for the directory: "ftp://ftp.stuff.com/~user/music/famous_artist" in the context of a search for information related to an entity's music product. First, the nice FTP crawling technique involves establishing a single connection to the FTP site 104 (even if multiple content is needed from the site) and then going to the root directory. Second, a counter is then marked zero and a directory listing and snapshot of the current directory is taken. For each directory, if the directory name is "interesting," then the directed page processing module 150 and downloaders 108 and 109 enter the directory, set the counter to a positive number (e.g., C=2), then repeat the listing and snapshot step. If the counter is greater than zero or the directory is on the way to the destination directory, then the directory is entered and then the listing and snapshot step is repeated.

To simulate human behavior, it is best if the directed page processing module 150 and downloaders 108 and 109 perform a depth first search, and introduce slight pauses between directory listings. "Interesting" directory listings are those containing terms related to the search criteria. For example, keywords for this search may include "songs," "sound," "album," "artist," "mp3," music_type, famous_artist, etc., and the destination directory (in the example, it can be "/famous-artist"), and other hard-coded directories that are usually of to interest (e.g., "/incoming").

In an alternative embodiment, user 202 could also specify that uninteresting directories be crawled as well. The purpose of the counter (C) is to set the amount (depth) of sub-directories that the directed page processing module 150, as well as downloaders 108 and 109 will crawl in order to find "interesting" files. In one embodiment of the invention, to ease the burden on FTP site 104 servers, the total number of directories that can be crawled in a single FTP session may be limited.

An example of the nice FTP crawling technique of the directed page processing module 150 and downloaders 108 and 109 are presented in Table 2 below. Table 2 illustrates a depth-first (from top to bottom) traversal of the directory structure of an FTP site 104.

TABLE 2

EXAMPLE OF NICE FTP CRAWLING TECHNIQUE ftp://ftp.stuff.com/
  ftp://ftp.stuff.com/~user
    ftp://ftp.stuff.com/~user/homework
    C ftp://ftp.stuff.com/~user/music
      C- ftp://ftp.stuff.com/~user/music/famous_artist1
      ...

TABLE 2-continued

EXAMPLE OF NICE FTP CRAWLING TECHNIQUE

*C- ftp://ftp.stuff.com/~user/music/famous_artist
      ...
      C- ftp://ftp.stuff.com/~user/music/famous_artist2
      ...
      C- ftp://ftp.stuff.com/~user/music/famous_artist3
      ...
    ftp://ftp.stuff.com/~user/poetry
  ftp://ftp.stuff.com/~user2
  ftp://ftp.stuff.com/~user3
  C ftp://ftp.stuff.com/incoming
  ...

C = directory judged to be "interesting" in context of the search and counter set to C
C- = counter decremented at this level of the directory tree
* = destination directory
... = the page processing module 110 crawls every subdirectory up to the depth of C under the directory The above-described "nice FTP crawling" allows users 202 to obtain reports with both the URL and contents of any interesting FTP site 104.

For any FTP site 104 where the password failed, it is passed over and the URL is removed from the preliminary set. If the site's server is not currently responding (i.e., "down" or "off-line"), too many users were already logged in, or otherwise unavailable for connection, the directed page processing module 150 and downloaders 108 and 109 applications, before removing the URL corresponding to those sites from the preliminary set, implement a "re-try" timer and mechanism.

In step 316, the locally downloaded pages are scored (i.e., ranked). The scoring of the individual pages is based on the inputs specified in the search criteria (step 304). Bach page is given a score based on a text search of keywords from the search criteria and statistics accumulated from analyzing the pages. The applications of processing modules 201 possess inference code logic that allows anything resident on a page or in the underlying HTML code (i.e., tags) that formats the page to be numerically weighted. The scoring may be based on the separate regions of the page such as the title or information within a tag (e.g., meta-tags, anchor tags, etc.). Also, scoring may be based on such information as the URL of the page itself, dimensions of pictures on the page, the presence of a specific picture file, the number of a certain type of file, length of sound files, watermarks, embedded source information, as well as information about a page provided by another page. During this process, the e-commerce metrics system 100 possesses logic to also recognize exact duplicates of an entity's graphics files (i.e., pictures, logos, etc.), without the need for digital water marking. This additional logic further contributes to the scoring process of step 316. The numbers, figures, and statistics generated by the scoring process is collectively referred to as metadata. Metadata is stored in database 120 in step 318.

The scoring of pages may also involve whether any offending URLs contain advertising. This is useful information to clients because those sites are considered commercial and not fan or personal (i.e., non-commercial) sites. Advertisement recognition is accomplished by parsing an image located within an URL and capturing the alt text (alt text is an HTML attribute that displays a block of text as an alternative to an image, for text-based browsers. It is used inside the <IMG>tag; the format is <IMG SRC="URL" ALT="TEXT"), click-through URL, click-through resolved URL, and URL of the image. Then, if any of the following three rules are met, the e-commerce metrics system 100 identifies the probable presence of an advertisement: (1) the alt text or URL of the advertisement image contains keywords common, to those around known advertisements; (2) the click-through URL and the resolved click through URL specify different domains; or (3) the image is an exact match of a known advertisement.

During this process, the e-commerce metrics system 100 develops a table of advertisement dimensions that are common to each Web site 106 encountered. Thus, in an alternative embodiment, a fourth rule is used to recognize advertisements. That is, if the dimensions of the image fit the tolerances of the dimensions in the table for a Web site 106, the image is probably an advertisement. The data, for the table of advertisement dimensions are kept in archive 115 and queried via the database 120. Accordingly, the score for each page is adjusted (i.e., increased) if the metrics system 100 identifies the presence of a probable advertisement.

In step 320, a archive of the pages is done to the storage media of archive 115. In order to archive each Web page, the "inline" contents of the page must be separated from the non-inline contents. Inline contents include any text, sounds, and images found directly on the Web page and that automatically plays or is displayed when the page is browsed. In contrast, non-inline contents include the links that Web pages contain to other Web sites 106. In order to obtain a "self-sustaining" local copy of the Web page, only the inline contents of each Web page of the preliminary list of URLs is stored in archive 115. In an alternative embodiment, a client may want included in their final report (step 330 described below) properties or metrics associated with non-inline contents of relevant pages. Thus, in such an embodiment, step 320 can also include the non-inline contents of each Web page (i.e., a "complete" archive). In yet another embodiment, the system 100 in step 320 could generate a snapshot of the page and store this snapshot as a single graphical image.

As indicated in FIG. 3, step 320 is optional. That is, a user may desire not to perform a complete archive (and thus, not create self-sustaining local copies of the Web pages. Thus, the operation of e-commerce metrics system 100 may proceed directly to step 322 after the pages are scored in step 316. In an alternative embodiment, step 320 may perform a summary archive where, for example, only the headers and/or titles of the pages is archived.

In step 322, the preliminary set of URLs is grouped into "actual sites." Most people equate Web sites 106 with either domain names or host names. For example, a URL of "http://www.a_company.com" and all the pages under it are typically viewed as one Web site 106. However, as Web designers develop schemes to partition their sites among distinct users, they divide their-name space to create sub-sites. Examples are "community sites" which are companies or organizations that provide free homepages to individual consumers, and university servers that host student homepages. In these examples, each user or student with a homepage is an "actual site." For example, the directed page processing module 150 application may obtain a preliminary list (from step 306) of probable URLs containing the URLs shown in Table 3 below.

TABLE 3

PRELIMINARY LIST OF URLs http://www.university_with_many_students.edu/students/b/joe_smith/main.html TABLE 3-continued PRELIMINARY LIST OF URLs http://www.university_with_many_students.edu/students/b/joe_smith/pics/me.jpg
http://www.university_with_many_students.edu/students/c/jane_hacker/main.html

.
.
.

In the example of Table 3, the first two URLs are one actual site, whereas the third is a separate actual site. In one embodiment of the invention, the page processing module 150 application may recognize which URLs to group into one actual site based both on: (1) patterns such as ~username, /students/?/<?>, /users/?/<?>, /homepages/?/<?>— where "?" is a single character wildcard and "<?>" is an optional single character wildcard; and (2) hard-coded rules for known sites which follow no discernable patterns (e.g., the GeoCitieS™ community site). The grouping step aids in arriving at a manageable but informative number of URLs that will be included in a user's final report. In one embodiment of the invention, the above-described grouping technique may be used, in conjunction with the score pages step 316, to present the user with the "best" (i.e., highest scoring) page within an actual site. This removes information clutter from the final report and further aids in arriving at a manageable number of URLs to report.

In step 322, the e-commerce metrics system 100 groups pages into preliminary set(s) of URLs to be selected by users 202 in step 324. This optional human intervention step allows a second (refined and smaller) set of probable URLs to be defined, where likely infringements or disparagements of the entity's Internet Protocol occur. The selection step 324 is essentially a feedback option for expanding on the preliminary list of URLs. This refinement allows for more selectivity than what is produced from the search criteria (step 304) or general filtering (step 312).

The e-commerce metrics system 100 automates the information gathering process in order to minimize the time required by human users and maximize their effectiveness. It is advisable, however, to have humans review and prioritize the set of probable URLs because no presently existing software has the ability to discern the intent of the use of content on a Web page. For example, the e-commerce metrics system may identify a page with an image of a famous professional athlete. The e-commerce metrics system, however, may not be able to identify whether the image is one where the athlete is pictured, without authorization, in his or her team uniform. Another example includes a page with a probable advertisement identified by the e-commerce metrics system 100 which is verified by a human user during step 324.

In one embodiment of the invention, the directed page processing module 150 application allows several users to visit, prioritize, and add analysis data to the preliminary set of URLs. As a user on any of the plurality of workstations 130 or workstations 140 visits and prioritizes a Web site 106 corresponding to a URL on the preliminary list, it is marked so no duplication of effort occurs. Further, the e-commerce metrics system 100 is also capable of logging, for record keeping purposes, which user has analyzed a page including a time stamp of when the analysis took place.

It should be noted that in alternative embodiments of the invention, the score pages step 316, full archive step 320, group pages step 322, and select groups step 324 may be performed in an order different than that presented herein without departing from the spirit and scope of the invention.

In step 328, the e-commerce metrics system 100 obtains additional information for each URL in the second refined set. This additional information is used to provide contact, routing and other information which does not need to be repeatedly determined (e.g., via searching) or is expensive in terms of the time required to gather, the monetary cost, and/or other resources. In one embodiment, this configuration is a result of the time required to operate on a subset of pages. For instance, the e-commerce metrics system 100, in an automated fashion, obtains the contact information from the Internet. The sources for this information include the Network Information Center (InterNIC). As is well-known in the relevant art(s), InterNIC is a consortium originated by the National Science Foundation to coordinate information services, directory and database services, and registration services within the Internet (i.e., computer network 103).

In step 330, a report is generated for the user. The report may be customized for a particular entity and typically includes the refined list of URLs, the contact information for each URL, the score for each URL, metadata provided by the processing modules 201, data provided by users of the e-commerce metrics system 100 (i.e., during step 324), as well as charts and graphs containing any metrics the user may request. Database 120 is utilized to query the archived metadata in generating reports, using the tables. Reports may relay information, for example, on how downloaded pages have changed over time. A more detailed description of output reports and examples are presented in Section VII below.

In step 332, the user, using the report, may then take action in accordance with the information presented in the report. In one embodiment of the invention, the information contained in the output report may be used by the e-commerce metrics system 100 to be directly inputted into an entity's business model. For example, the output report may be used to automatically generate: (1) Cease and desist letters (customized for each entity) to each offending Web site 106 operator; (2) Reminder letters to channel partners and affiliates about proper pricing, privacy, warranty and refund policies; and/or (3) Marketing trend graphs estimating the traffic levels of Web sites 106. Additional output reports can be implemented. One skilled in the relevant art(s) based at least on the teachings described herein can recognize the applicability of the information and metadata to specific entity e-commerce concerns. Flowchart 300 (i.e., the operation of e-commerce metrics system 100) is thus complete as indicated by step 334.

As shown in FIG. 3, step 324 contains a feedback loops to step 316 (score pages) and step 322 (group sites). This is because the processing modules 201, in one embodiment, can be run several times to further refine the list of probable URLs. The downloaders 108 and 109 may search in one of two modes. The first is a "meta search engine" mode where the search criteria defined in step 310 are searched among a plurality of existing, commercially available, search engines available on the Internet. The second is a "standard search" mode where a list of individual sites is searched. In the "standard search" mode, the list of individual sites may be a list which is a subset of the preliminary lists of sites returned from the meta search mode, a list provided from the client as known (i.e., past) offending sites, or links found within the pages of the URLs located during the meta search mode. The feedback loops further aid in arriving at a manageable number of URLs to be included in a user's final report during step 330.

As mentioned above, in one embodiment of the invention, the search engine modes of directed page processing module 150, and downloaders 108 and 109 are high-level programming language (e.g., C++) applications written for the Microsoft Windows™ environment. In one embodiment, the applications are multi-threaded. That is, the program execution environment interleaves instructions from multiple independent execution "threads." The multi-threaded applications thus allow multiple instances of each component (thread) to run simultaneously, on the same computer or in a distributed fashion, thereby increasing the throughput of the e-commerce metrics system 100 (i.e., allows searching for multiple entities to be done simultaneously).

As mentioned above, the search (get probable URLs) step 306 contains "feedback loops" from steps 316 (score pages) and 324 (group sites). The search may be performed in one of two modes to aid in arriving at a manageable number of URLs to be included in a user's final report. The two modes are "meta search engine" mode and "standard search" mode.

As indicated in FIG. 3, step 306 contains a "feedback loop" from steps 310 (score pages) and 316 (prioritize sites). Once a "meta search engine" mode search has been performed, a "standard search" where a list of individual sites is searched may be performed. Alternatively, the "standard search" may search a list provided from a client as known offending sites. Each site is visited and made available to the archive 115 (to perform step 320 as indicated in FIG. 3).

The meta search engine mode, according to an embodiment of the invention, begins with control passing immediately to the processing modules 201 The processing modules 201 receive from the front-end a list of selected search engines to be searched. As is well-known in the relevant art(s), many commercial and non-commercial search engines are available on the Internet that allow remote access to perform keyword searches for information (e.g., full text, document titles, URLs, headers, etc.). Examples of such commercially available search engines include the HotBot™, Excite™, and InfoSeek™ search engines.

The defined search criteria received by the front end are translated into keywords in order to perform an appropriate search of the selected search engines. In the case of directed page processing module 150, the application is ready to perform keyword searches using the selected search engines. However, in the case of page processing module 150, the application forwards the search criteria to downloaders 108 and 109. Both the directed page processing module 150, and downloaders 108 and 109 applications must first sub-divide a large query into a set of sub-queries sufficiently small for existing search engines to perform, based on the maximum number of URL matches (or "hits") which they return. Thus, in order to perform a full search and ensure the preliminary list of probable URLs that is sufficiently large, an optimizing series of searching steps is performed by implementing a boolean search tree.

A main topic keyword is identified from the translated search criteria derived. A set of related topic keywords is identified from the translated search criteria derived. The search engine is queried for the main topic keyword. It is determined whether the number of hits is below the maximum limit. If the number of hits is below the maximum limit, the list of returned URLs (hits) is collected.

If the number of hits is not below the maximum limit, it is determined whether there are any unused (i.e., not queried) keywords from the set of related topic keywords. If there are any unused set of related topic keywords, the applications of downloaders 108 and 109 construct two new search queries: (1) {topic} AND {next unused related keyword}; and (2) {topic} AND NOT {next unused related keyword}. Then, the two new query terms are searched. This process is recursively repeated until all number of hits are below the limit or no more unused related keyword remain. All the lists of returned URLs (hits) from each query are then collected.

An example of the above-described optimizing series of searching (i.e., a boolean search tree) is shown in Table 4 below. As will be apparent to one skilled in the relevant art(s), the searching can be repeated for every search engine selected in step 310.

TABLE 4

EXAMPLE OF OPTIMIZING SERIES OF SEARCHING STEPS

Search Engine Limit = 1000 hits  
Topic = car  
Related Words = {sports, red, new, Brand ™, truck}  
Queries =  
    Car {5000 hits}  
        Car AND sports {3500 hits}  
            (Car AND sports) AND new {800 hits}*  
            (Car AND sports) AND NOT new {2700 hits}  
                ((Car AND sports) AND NOT new) AND Brand {900 hits}*  
                ((Car AND sports) AND NOT new) AND NOT Brand {1600 hits}  
                (((Car AND sports) AND NOT new) AND NOT Brand) {700 hits}*  
                (((Car AND sports) AND NOT new) AND NOT Brand) {900 hits}*  
        Car AND NOT sports {1500 hits}  
            (Car AND NOT sports) AND new {900 hits}*  
            (Car AND NOT sports) AND NOT new {600 hits}*

*The results of these queries may be downloaded and combined into an (unordered) list of probable URLs.

As mentioned above, the e-commerce metrics system 100 may also monitor addresses and search for contents, within the Computer network 103, from sites other than Web sites 106 and FTP sites 104.

If, as part of the searching step 310, a URL that specifies an entire newsgroup is encountered, the page processing module 1110 application can direct news downloader 109 to connect to a newsgroup server using the network news transfer protocol (NNTP), and download all news postings in the specified newsgroup that have not been previously downloaded (determined through message ID numbers). Each news posting is considered an individual piece of content or page. Associated data such as the headers are also kept, as they provide extra data the help discern the content and intent of the page. In an embodiment of the invention, the directed page processing module 150 may be put in a "continuous monitor" mode to continually monitor a newsgroup. Thus, the directed page processing module 150 application can re-execute the above-described process at an interval shorter than the time a news server times-out and deletes messages that the page-processing module 150 application has not yet archived. This embodiment frees the resources of News downloader 109 to search older newgroups in the list for additional information.

If as part of the downloading steps 308 and 314, an URL that specifies a real-time content site, such as a chat room, or live real audio stream is encountered, the directed page processing module 150, and downloaders 108 and 109 can watch a stream of data coming from the desired source. As is well-known in the relevant art(s), chat streams typically use the Internet relay chat (IRC) protocol, while real audio streams typically use the Portable Anymap (PNM) protocol. The applications can then save the stream in a form that can later be used for playback (i.e., a "self-sustaining" copy). Because the stream has the potential to play forever, it is desired to divide the stream into chunks that may be reassembled at a later time. Thus, monitoring continues until either the stream stops, the capture time specified by the user has expired, or if a live filter is being used, the data is shown to be "uninteresting." It is important for directed page processing module 150 to be controlled by a scheduler in order to capture such real-time streams as they are transient and can otherwise be missed. In one embodiment, the logic for a scheduler is encompassed by the module 150 itself and managed by users 202.

V. Graphical User Interface (Front-End)

As mentioned above, in one embodiment of the invention, the Client/analyst Web server 125 front-end provides dynamic HTML pages as the input (GUI) screens to the users 202. The software architecture 200 (as shown in FIG. 2) allows users to view and manipulate the database 120 and the archive 115 without needing to communicate with the processing modules 201.

The step of defining the search criteria (step 304 of FIG. 3) may be customized for each entity and their monitoring needs. The e-commerce metrics system 100, and more particularly the operation of the directed page processing module 150 application search engine, is sufficiently flexible in order to assure that standard or customized input screens can be used in step 302.

The customized input HTML GUI screens of the invention will be dictated by the particular entity's needs. For example, users will focus their e-commerce efforts in different areas. The criteria for prioritization may include such factors as whether advertisements appear on the Web site 106, the magnitude of competing activity, misuse of an entity's intellectual property, etc. Thus, preferably before commencing a search, search criteria are defined that includes a main topic, fields, prioritizations, and de-prioritizations.

Given the vast amount of information on the Internet, it is important to define the main topic that is to be searched. While the e-commerce metrics system 100 has the ability to search extremely broad topics, the narrower the topic, the more efficient the search. Search topics may include any combination of company names, company subsidiaries, company assets (e.g., a particular artist on a particular record label), etc. In order to maximize the probability of including all relevant information into a search, it is also important to define all possible permutations of a topic. For example, in order to retrieve all of the pages pertaining to a specific company, the e-commerce metrics system 100 can need to search the company name, nicknames, its acronym, its products and/or its services.

Prior to commencing the actual search step 306, it is preferable to define exactly what fields of information need to be searched. Examples of relevant information fields include the topics: origin, perception, usage, links, etc. and the categories: personal, education, commercial, foundation, etc. (i.e., categories for origin). In one embodiment, where an entity wishes to take advantage of the e-commerce metrics system 100 capabilities does not understand what topics or categories to search, another user can define initial topics and categories, based on prior experience and knowledge, and then the entity to modify these initial definitions based on the entity's knowledge of their business and industry.

Finally, it is important to prioritize and de-prioritize pages based on an entity's needs. The users 202 may work to build a prioritization list, and assign numeric weights to the items on the list. These items are those described above with reference to FIG. 3 (i.e., scoring contents step 316) and below with reference to FIG. 5.

As will be apparent to one skilled in the relevant art(s), the GUI of the front-end 125 will allow users 202 of e-commerce metrics system 100 to specify all inputs (e.g., search criteria, FTP depth counter(s), list of specific URLs to search, the total number of sub-directories to crawl, etc.) and mode options (e.g., full, partial, or no archive, etc.) described herein.

VI. Page Processing Modules (Back-End)

Figure 4:
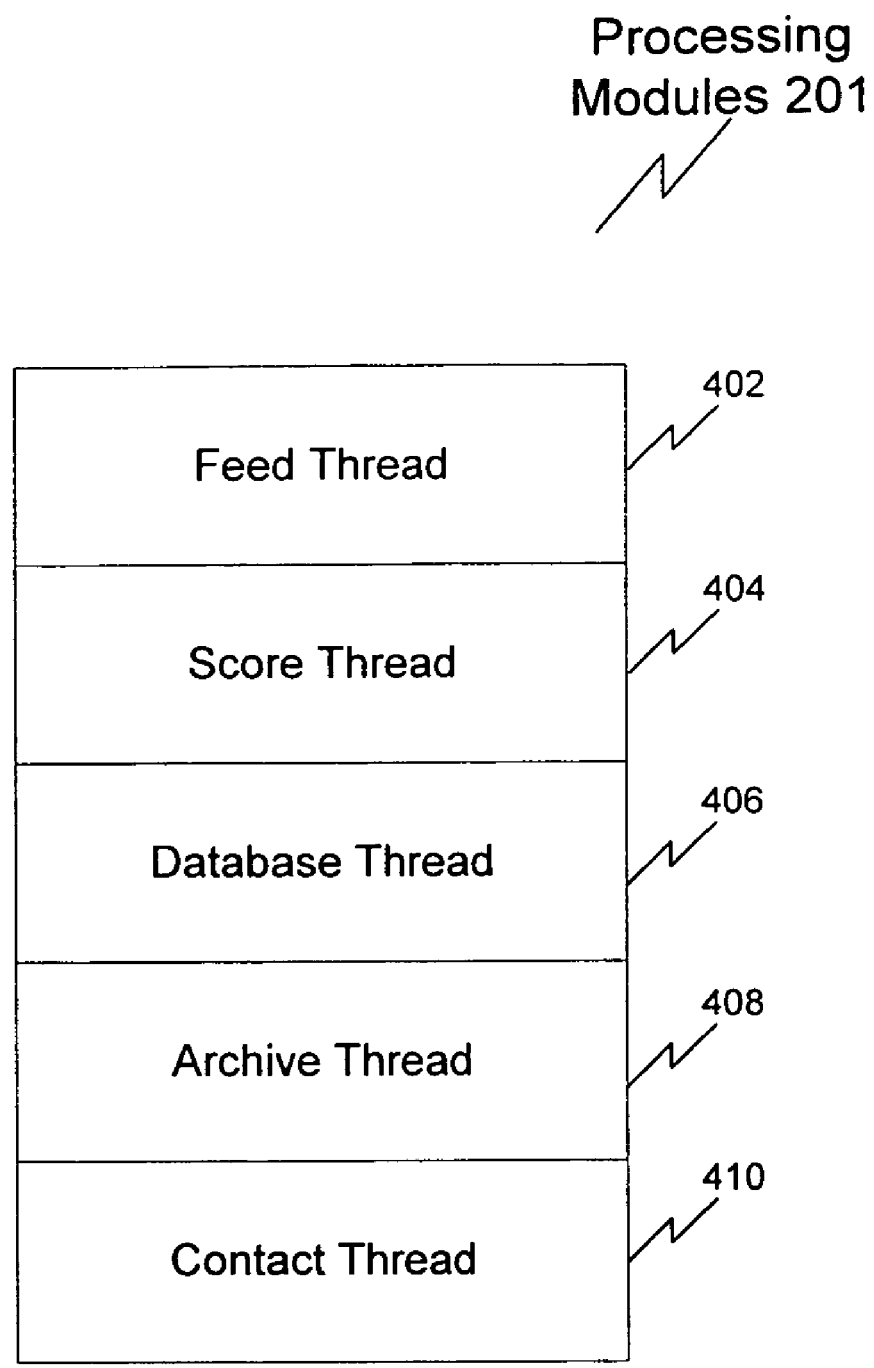
FIG. 4 is a block diagram illustrating the software architecture of a page processing module according to an embodiment of the invention.

As mentioned above, in one embodiment of the invention, the processing modules 201 back-end are high-level programming language (e.g., C++) applications written for the Microsoft Windows™ environment. Referring to FIG. 4, a block diagram illustrating the software architecture of the processing modules 201 applications is shown. In one embodiment, the processing modules 201 applications are multi-threaded. That is, the program execution environment interleaves instructions from multiple independent execution "threads." The multi-threaded processing modules 201 applications thus allow multiple instances of each component (thread) to run simultaneously, on the same computer or in a distributed fashion, thereby increasing the throughput of the e-commerce metrics system ido (i.e., allows processing for multiple entities to be done simultaneously). The threads of the processing modules 201 applications include a feed thread 402, an score thread 404, a database thread 406, an archive thread 408, and a contact thread 410.

The feed thread 402 performs steps 504 to 508 as described below with reference to FIG. 5. That is, the feed thread 402 is responsible for receiving pages from downloaders 108 and 109, and within directed page processing module 150 (step 504). The feed thread 402 also temporarily stores the pages (step 506) before feeding them (step 508) into the scoring steps 512–518.

The score thread 404 performs steps 512–518 as described below with reference to FIG. 5. That is, the score thread 404 is responsible for scoring and grouping the Web pages of the URLs previously downloaded by the feed thread 402. The scoring thread 404 possesses code logic to recognize and extract metadata from each page in order to later generate an entity's report. Such metadata includes descriptions, titles, electronic mail addresses, etc. The scoring of each URL done by the scoring thread 404 is based on the presence, location, and the number of occurrences of certain keywords, links, HTML tags, etc. Furthermore, in addition to scoring the URLs, the "best" (i.e., highest scoring) page from each actual site is marked. The scores aids in and may be modified during the human intervention grouping step 324, as described above with reference to FIG. 3.

The database thread 406 performs step 318 as described above with reference to FIG. 3. That is, the database thread is responsible for storing associated information about the Web page other than its content. Such information (file size, dimensions, hash value, date archived, file type, width, height, etc.) assures that only modified Web pages, which may have been previously downloaded, are re-downloaded. This also ensures that duplicate and mirror pages are not downloaded and removed from the list of probable URLs. Furthermore, the database thread 406 possesses intelligence to check return values and error messages when visiting each Web page for downloading. If any URL is unavailable (e.g., non-valid or inactive), before it is passed over and removed from the list of probable URLs, a "re-try" timer and mechanism is utilized.

The archive thread 408 performs step 320 described above reference to FIG. 3 That is, the archive thread 408 is responsible for fully archiving the URLs downloaded by the score thread 404 to the storage media of archive 115. The archive thread 408 archives the inline contents of each Web page of each URLs to the archive 115. This assures that e-commerce metrics system 100 has a "self-sustaining" local copy of the Web page for later analysis. That is, archived pages will use the archived copy of its links when later browsed within e-commerce metrics system 100. The archive thread 408 also possesses code logic to time-stamp the pages and thus, create a "paper trail" that documents the evolution of an offending Web site. This paper trail may also later serve as evidence for a user's legal (enforcement) activities. The archive thread allows the relational database 120 to have access to the archived data when asked to perform queries during the reporting step 330.

The contact thread 410 performs within step 510 as described below with reference to FIG. 5. That is, the contact thread is responsible for the automated task of obtaining the InterNIC contact information for each URL in the refined list obtained from the database thread 406 and stored by the archive thread 408.

Figure 5:
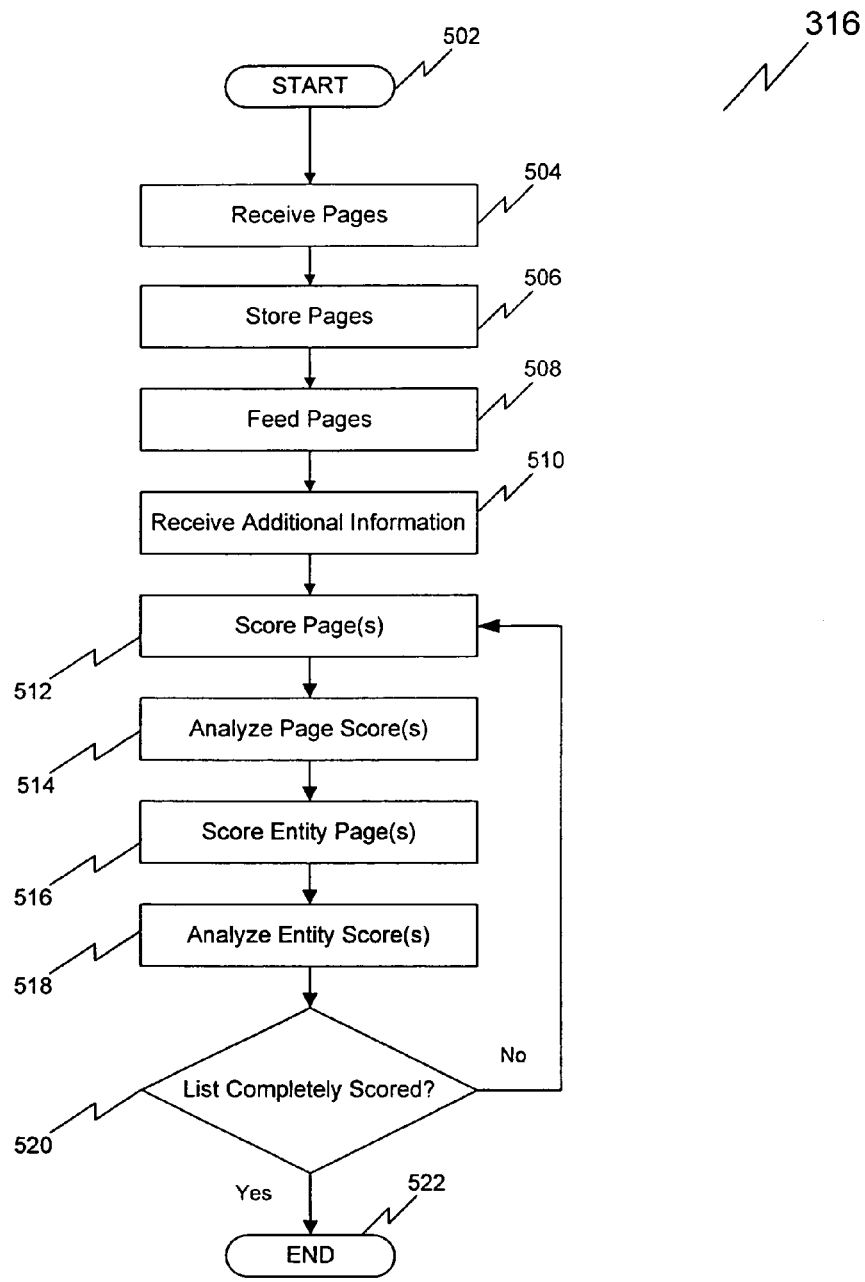
FIG. 5 is a flowchart showing the operation of scoring pages, according to an embodiment of the invention.

Referring to FIG. 5, a flowchart showing the scoring operations of processing modules 201 (during step 316), according to an embodiment of the invention, is shown. Flowchart 316 begins at step 502 with control passing immediately to step 504. In step 504, downloaded pages are sent to processing modules 201 to be scored.

In step 506, the received pages are temporarily stored so that they may be steadily fed into the scoring processes without possible delays from step 504. In step 508, pages are fed into the scoring process (step 512) along with additional information (step 510) from contact thread 410 and existing metadata in database 120. Scoring step 512 processes the information found on the page in order to determine the content and intent of the page. The score results are eventually stored as metadata.

In step 514, the page scores are analyzed for higher order information purposes, such as Web site patterns and ownership. For instance, pages can be counted for various browser magnets. Browser magnets take various forms: domain names, links, metatags, text, titles, and URLs. By counting (summing) all of the instances of these magnets, step 514 can generate statistics that determine the location within a Web site and on a Web page or other page. For example, the statistics would determine that the location of the entity's name or brands are on pages that contain other entity's name(s) and/or brand(s). The pages are archived in archive 115 to preserve their content because the actual Web sites are subject to factors outside of the system's control (step 320). Metadata containing scoring information and determined statistics are stored in database 120 (step 318).

Once the initial scoring and analysis is complete (steps 512 and 514), entity specific pages are scored for specific information relevant to the entity (step 516). This metadata is then analyzed to determine trends, reach conclusions about the entity score(s), etc. (step 518). Once all the entities's pages are scored and the list is completed, the routine ends (step 522).

FIGS. 6, 7, 8A and 8B show input search screens of the present invention. The information in these screens is stored as metadata in database 120. Users 202 input the information to enable the system 100 to search, retrieve and score pages. These screens are exemplary and for illustrative purposes only, as the present invention is sufficiently flexible to allow different screen designs. It should be noted that the particular information appearing in input screens of the e-commerce metrics system 100, result from the entity's e-commerce needs. Thus, it will be apparent to one skilled in the relevant art(s) that the search criteria defined in steps 304 and 310 dictate the information that will be extracted from the pages of the URLs during operation of the e-commerce metrics system 100. The search criteria also dictate the types of queries the processing modules 201 will make of the relational database 120 during the generate report step 330.

Referring to FIG. 6, an input screen 602 for entering and reviewing score words is shown. This screen is used to create score words and formulae. The words and formulae are prioritized with a number value which aids in the ordering of operations performed on downloaded pages. In one example, score words are used to filter out insignificant data (step 312) and sort the remainder based on resulting score (step 316).

In one embodiment, FIGS. 6 and 7 show the score words and formulae for scoring step 516 and analyzing step 518 of score pages routine 316 (as shown in FIG. 5). Entity specific information is stored and used as the basis for the scoring process. In another embodiment, FIGS. 8A and 8B show the score words and formulae for scoring step 512 and analyzing step 514 of score pages routine 316 (as shown in FIG. 5). Global information is used to score and analyze pages into non-entity specific categories while steps 516 and 518 focus on the entity specific information that may be present on the pages.

Referring to FIG. 6, screen 602 includes a nonce 604 field is a unique value assigned to a word that will be searched. Nonce 604 field can be PC assigned and checked to avoid duplication. Similarly, a word 606 field shows the search term (or words) and can be designed to show a listing of words. Words that make up word 606 field are also PC generated and are determined from the search criteria or information entered by users 202. Version 610 field tracks the number of times a score word has been modified, activated and/or deactivated. Comment 610 field allows users 202 to enter comments which can be displayed along with the score words to aid in the understanding of any particular score word.

Some of the elements of input screen 602 take the form of a button, hot spot or link which provide additional functionality. The form of these elements is not critical to the operation of the e-commerce metrics system 100 and are for illustrative purposes only. Edit field 612 is a field which when entered allows for the alteration of the score word. Attributes 614 field displays a listing of the properties of a score word. These properties are shown in the lower half of the input screen 602. These properties include: score name 622 field, primary page score 626 field, boost points 628 field (optional), and functions: show debug info 616 link, reset 618 link, and submit 620 link.

The attributes 614 field for a score word apply to the score formula shown in FIG. 7. By altering the attributes 614 field (such as, the score 622 field), the formula is altered. Score name 622 field is filled with the name of the score word. Using reset 618 link on this element will erase the particular score name 622 field selected. Primary score page 626 field provides operational ordering to the score word. By selecting various ordering options, the primary score page 626 field can provide a higher or lower priority to the score word. Boost points 628 field is an optional element which allows for the arbitrary increase or 4 decrease in the score.

FIG. 7 shows input screen 702 for managing score formulae. Screen 702 includes nonce field 704, formula field 706, version field 708, operational_order field 710, comment field 712, and edit link 714. Edit link 714 allows for access to buttons, hot spots and/or links: add link 716, modify link 718, and delete link 720.

Score formulae can be customized for any entity, based on score words and other factors. Nonce field 704 is similar to nonce field 604 and provides a unique identifier. Formula field 706 is similar to word field 606 and contains the formula bases on either word(s) or nonce(s), or both. Version field 708 is similar to version field 608. Operational_order field 710 is a value used to identify the order in which formulae will be completed. In one embodiment, score formulae are processed based on their operational order or dependencies. For example, a formula may require the result determined by another formula. Thus, the latter formula can have to be calculated before the former. In another embodiment, where the operational order is the same (i.e., there are no dependencies) formulae can be processed simultaneously or in a random order. In some instances, a score formula contains a variable which is determined by another score formula(e). In these instances, certain score formula(e) must be completed first.

Comment field 712 is similar to comment field 610 and provide users 202 with a way to comment on a formula. Edit link 714 allows for the editing of formulae. Add link 716, modify link 718 and delete link 720 provide functional elements for affecting formula(e). Active field 722 displays the level of activity (on or off in some embodiments) of a formula. Functions field 724 provides a listing of common functions, logical statements, and/or algebraic terms. These provide any one of users 202 with expressions from which to build score formulae. E-types field 726 is a value which allows any one of users 202 to set the type of elements (such as entire pages, html, binaries, or images) included in the scoring process on a per score formula basis. Mime-types field 728 is similar to e-types field 726 and allows selection of specific mime-type values.

Top-level domain types field 730 provides a listing of specific top-level domain names to be included in a search as belonging to a specific entity. Input box 732 is a field that allows to modification of any of the above elements when it is selected. Attributes field 734 provide similar attribute information as attributes field 614 in FIG. 6.

FIG. 8A shows input screen for global word, group and formula screen 802. Screen 802 provides similar variables and functionality as the screens of FIGS. 6 and 7, but with respect to words and formulae which apply to all the pages downloaded by e-commerce metrics system 100. Global score words field 804 include a set of score words with nonce field 808, version field 810 and attribute field 812. These fields are similar to those discussed with reference to screens 602 and 702.

Additionally, global score groups 806 are formed from sets of global score words field 804. Groups 806 include nonce field 814, version field 816 and attributes field 818 elements similar to those discussed with reference to FIGS. 6 and 7. Global score formulae field 803 are similar to score formulae field 702 and have similar elements: nonce field 820, version field 822, operational_order field 824, comment field 826, edit field 828 and attributes field 830.

Attributes field 830 are shown in more detail in FIG. 8B, and include score word field 854, add a word link 856, nonce field 858, version field 860, comment field 862, human readable field 864, full word field 866, case sensitive field 868, regular expression (regex) field 870, regex help field 872, and regex translation field 874. Fields 854, 856, 858, 860, and 862 are similar to the fields discussed above with respect to FIGS. 6 and 7. Human readable field 864 allows any one of users 202 to enter a human readable version of a formula(e) or word(s). Full word field 866 is an optional feature that allows for the inclusion of the full score word in the scoring process. Case sensitive field 868 is similar to full word field 866 and is an optional feature for pre-determining if scoring is based on case sensitive score words. Regular expression-(regex) field 870 is an optional feature which allows for the inclusion in the scoring process of words which only change in their suffixes, such as hack, hacker, hacked, hacking, hackers, etc. Regex help field 872 is an optional feature for translating regular expressions into score words. Regex translation field 874 provides an optional quick reference for reviewing regular expressions before and after translating them with regex help field 872.

VII. Output Reports

Similar to the search input screens of FIGS. 6, 7, 8A, and 8B, and the step of defining the search criteria (step 302 of FIG. 3), the output reports of the invention may be also be customized for each user 202. The e-commerce metrics system 100, and more particularly the operation of the processing modules 201 application threads, is sufficiently flexible in order to assure that customized reports may be generated and delivered in electronic (soft copy) or paper (hard copy) form.

Figure 9:
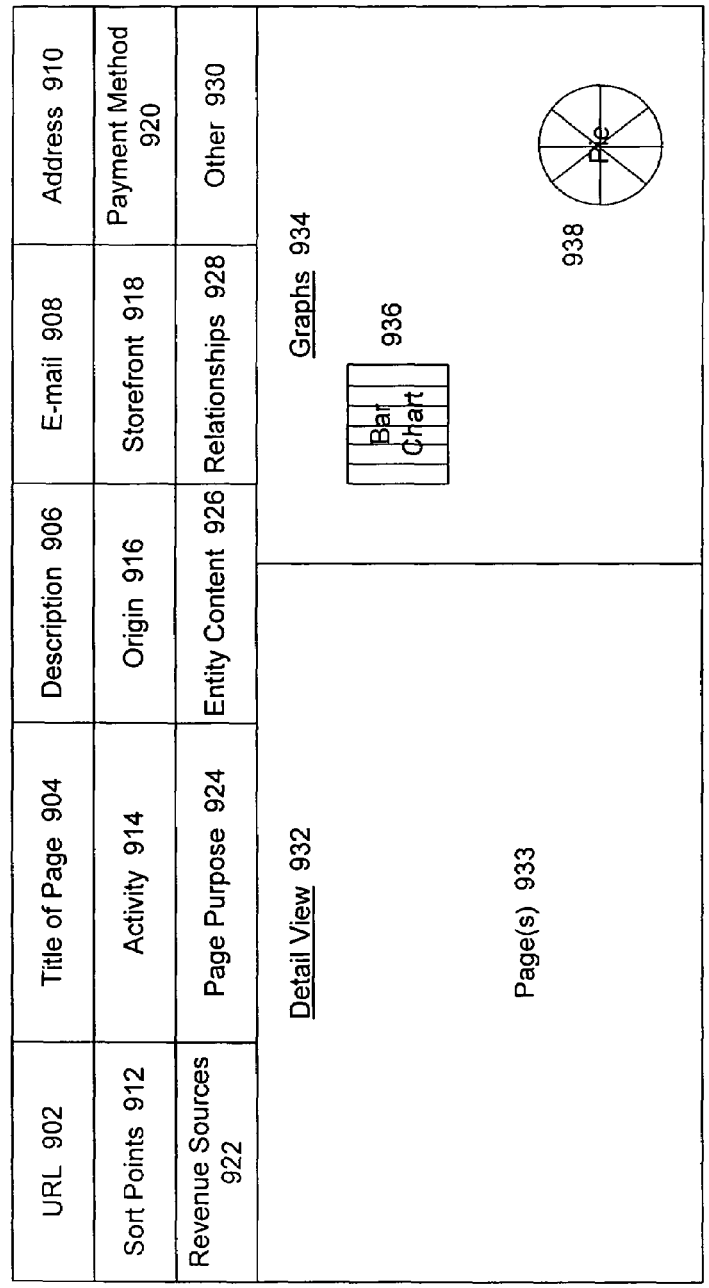

Referring to FIG. 9, an standard output report page 900, according to an embodiment of the invention, is shown. Output report page 900 is a table that includes a field 902 for each URL that e-commerce metrics system 100 returned as having contents matching the search criteria entered by the users 202. Each field can contain the information specified by the field headers. For example, a field 902 contains the URL of the Web site 106 or FTP site 104. A field 904, 906, and 908 can contain the title of the page, a description, and any electronic mail addresses, respectively, extracted from the page during the operation of the e-commerce metrics system 100. A field 910 can contain the contact information for the URL registrant (i.e., street address, telephone number, fax number, etc.). Thus, page 900 is a report page that may be generated for every entity that utilizes system 100 regardless of the search criteria or the entity's form of business.

Report page 900 also includes a field 912 containing the page's score according to the search criteria and as assigned by the score pages step 316 (of FIG. 3). A field 914 can contain the type of activity engaged in by the operator of the Web site 106. A field 916 can contain the origin of the page (i.e., whether the page is a commercial page or a private page). Further, a field 918 can contain the storefront that the page is adverting for its product. In other words, whether the Web site 106 is engaged in electronic commerce ("virtual") or simply advertising an actual "physical" store. A field 920 indicates the form of payment the operator of the Web site 106 accepts (e.g, credit card, cash, check, etc.). A field 922 indicates the source(s) of revenue for the operator of the Web site 106 (e.g., advertisements, subscriptions, contests, etc.). A field 924 indicates the type (e.g., personal homepage, commercial, etc.) of Web site 106 referenced by the page. A field 926 indicates what form(s) of the entity's content (e.g., video, logo, text, etc.) may be found on the offending Web site 106. Finally, a field 928 indicates what relationship(s) Web site 106 references on the page. As will be apparent of one skilled in the relevant art(s), the field headings may also be changed to reflect the requested metrics of a particular entity (field 930 shows room for additional fields).

Additionally, report page 900 includes a graphic section 934 with an example bar chart 936 and an example pie chart 938. Bar chart 936 indicates the form(s) of the entity's content have been found on Web sites 106 and the frequency of such findings for a particular search. The columns in bar chart 936 display the frequency of audio, video, graphic, text, and logo, respectively, the e-commerce metrics system 100 has found within the Web sites 106. These metrics are available for reporting because the processing modules 201 (during the page scoring step 316) extract the necessary information from the downloaded pages.

Pie chart 938 indicates the types of Web sites 106 (i.e., the purpose of the sites) and the frequency of such types for a particular search. Pie chart 938 presents the metrics displaying the frequencies, while a legend explains the types of pages.

It should be noted that the particular metrics appearing in output pages of the e-commerce metrics system 100, result from the entity's e-commerce needs. Thus, it will be apparent to one skilled in the relevant art(s) that the search criteria defined in steps 304 and 310 dictate the information that will be extracted from the pages of the URLs during operation of the e-commerce metrics system 100. The search criteria also dictate the types of queries the processing modules 201 will make of the relational database 120 during the generate report step 330.

FIG. 10 shows an output report page 1000 according to an embodiment of the invention. Output report page 1000 is a report page that can be tailored to a specific entity or entities. Executive summary 1002, site analysis 1004, trending 1008 and help 1010 can be buttons, links or hot spots. These provide access to various report styles. For example, executive summary 1002 might display a list of key findings 1012 and important sites 1014. These listings might display a series of statements 1016 and URLs 1018. The content provided in report page 1000 provides any one of users 202 with information regarding the operations, perceptions and situations of any entity. Site analysis 1004 might go into more detail regarding the important sites 1014. Trending 1008 might display historical calculations based on metadata collected in the scoring process over a period of months.

VIII. Front-End and Back-End Severability

In one embodiment of the invention, the front-end and back-end of the e-commerce metrics system 100 are constructed so that they may operate independently of each other. The practical implications of this is that the front-end is able to provide uninterrupted ("24 hours a day and 7 days per week") service to view archived data (i.e., contents of offending sites), while the back-end is either unavailable or focusing on a different subset of entities. Because the front-end is the entire GUI to use the e-commerce metrics system 100 (and thus, controls the activities of the back-end), it possesses code logic to not only communicate with the processing modules 201 applications via HTTP, but also utilize a message queuing system to leave "messages" when the back-end is unavailable due to failure, maintenance, upgrades, etc. This may be implemented by using the database 120 to log commands, which the processing modules 201 may "pick-up" when it returns online. The same queuing system is utilized to queue commands from the plurality of users 202. Furthermore, the DHTML pages of the Web server 125 allow certain user functions (e.g., user validation) to occur entirely on the front-end, thus improving the performance of the processing modules 201 back-end.

In an embodiment of the invention, internal users of the e-commerce metrics system 100 (for security reasons) have access to the page processing module 110 via the HTTP communication link between the users 140 and the page processing module 110, as shown in FIG. 2. This is a faster communications link to the page processing module 110 because the Web server 125 and database 120 are bypassed. Consequently, messages sent to the page processing module 110 back-end via this path are not queued, but executed directly without waiting. This path may be used to send commands needing immediate effect (e.g., turn on/off or modifying search variables in real-time).

IX. Environment

Figure 11:
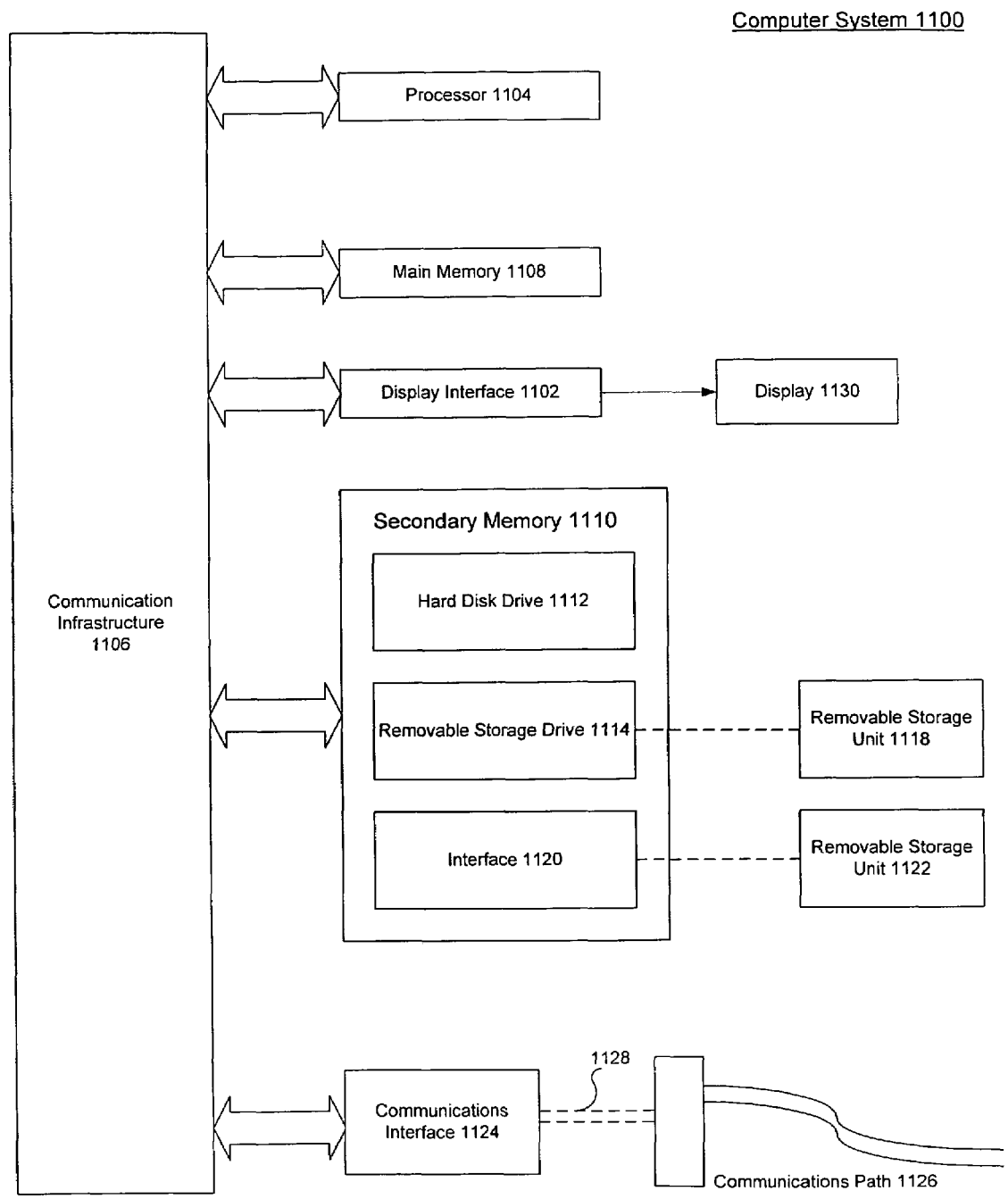
FIG. 11 is a block diagram of an exemplary computer system useful for implementing the invention.

The present invention (i.e., e-commerce metrics system 100 or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 1100 is shown in FIG. 11. The computer system 1100 includes one or more processors, such as processor 1104. The processor 1104 is connected to a communication infrastructure 1106 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 1100 can include a display interface 1102 that forwards graphics, text, and other data from the communication infrastructure 1106 (or from a frame buffer not shown) for display on the display unit 1130.

Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118, represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, a phone line, a cellular phone link, an RF link and other communications channels.

In this document, the terms "computer program medium" and "computer usable medium" are used to generally refer to media such as removable storage drive 1114, a hard disk installed in hard disk drive 1112, and signals 1128. These computer program products are means for providing software to computer system 1100. The invention is directed to such computer program products.

Computer programs (also called computer control logic) are stored in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

X. CONCLUSION

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary embodiments, but should be defined only in accordance with the following claims and their equivalents.

What is claimed is:

1. A method for developing and interpreting e-commerce metrics of an entity, comprising the steps of:
   (1) collecting pages that are commonly transmitted over a computer network;
   (2) receiving a list of predetermined, entity-specific criteria defining information relevant to the entity;
   (3) receiving a first set of rules related to entity-specific criteria defining information relevant to an entity;
   (4) determining whether each of said pages satisfies each of said first set of rules therefore obtaining a first subset of said pages;
   (5) parsing content of said first subset of said pages using a second set of rules inclusive of said first set and adding rules related to searching for at least one key word in at least one predetermined category of key words, thereby obtaining a second subset of said pages;
   (6) scoring said second subset of said pages utilizing a third set of rules incorporating analyzed statistics based on said first and said second set of rules and incorporating additional information; and
   (7) generating a report utilizing a fourth set of rules prioritizing results of said second and third set of rules, including said analyzed statistics and said additional information;
   such that said report is utilized to aid an entity in doing business over said computer network.

2. The method of claim 1, wherein said computer network is the global Internet.

3. The method of claim 1, wherein said computer network is an intranet.

4. The method of claim 1, wherein said computer network is an extranet.

5. The method of claim 2, further comprising the steps of:
   (8) obtaining contact information for said report.

6. The method of claim 2, further comprising the step of:
   (8) generating said report listing scores.

7. The method of claim 1, wherein step 6 comprises the steps of:
   (a) compiling statistics from said second subset of said pages;
   (b) storing said statistics; and
   (c) analyzing said statistics by combining said statistics, said second subset of said pages and said additional information.

8. The method of claim 7, further comprising the steps of: performing step (a)–(c) for a plurality of entities.

9. A system for developing and interpreting e-commerce metrics of an entity, comprising:
   a downloader for searching a computer network, wherein said computer network contains pages;
   a page processing module for receiving said pages downloaded from said search of said computer network, said page processing module utilizing a first set of rules related to entity-specific criteria defining information relevant to an entity and forming a first subset of pages;
   an archive for storing said first subset of said pages, said pages being downloaded to said archive by said page processing module; and
   a database for allowing said page processing module to perform queries of said pages from said first subset of said pages, stored on said archive, in order to produce a report, said report comprising:
      parsed content of said pages generated utilizing a second set of rules inclusive of said first set and adding rules related to searching for at least one key word, whereby the parsed content is parsed with at least one predetermined category;
      scored pages generated utilizing a third set of rules incorporating analyzed statistics based on said first and said second set of rules and incorporating additional information; and
      pages prioritized utilizing a fourth set of rules prioritizing contents of said report utilizing results of said second and said third set of rules including said analyzed statistics and said additional information;
   such that said report is utilized to aid an entity in doing business over said computer network.

10. The system of claim 9, wherein said computer network is the global Internet.

11. The system of claim 9, wherein said computer network is an intranet.

12. The system of claim 9, wherein said computer network is an extranet.

13. The system of claim 10, further comprising:
   a plurality of Web clients that provides a graphical user interface for a user to enter search criteria and communicate with said downloader, thereby controlling said page processing module.

14. A computer program product comprising a computer usable medium having computer readable program code means embodied in said medium for causing an application program to execute on a computer that develops and interprets e-commerce metrics of an entity, said computer readable program code means comprising:
   first computer readable program code means for causing the computer to collect pages that are commonly transmitted over a computer network;
   second computer readable program code means for causing the computer to receive a first set of rules related to entity specific criteria defining information relevant to the entity;
   third computer readable program code means for causing the computer to determine whether each of said pages satisfies each of said first set of rules therefore obtaining a first subset of said pages,
   fourth computer readable program code means for parsing content of said first subset of said pages using a second set of rules inclusive of the first set and adding rules related to searching for at least one key word in at least one predetermined category of key words, thereby obtaining a second subset of said pages;
   fifth computer readable program code means for scoring said second subset of said pages utilizing a third set of rules incorporating analyzed statistics based on the first and the second set of rules and incorporating additional information; and
   sixth computer readable program code means for causing the computer to generate a report utilizing a fourth set of rules;

contents of the report utilizing results of the second and third set of rules including the analyzed statistics and said additional information;

such that said report is utilized to aid an entity in doing business over said computer network.

15. The computer program product of claim 14, wherein said computer network is the global Internet.

16. The computer program product of claim 15, further comprising:

seventh computer readable program code means for causing the computer to obtain contact information for said report.

17. The computer program product of claim 15, further comprising:

seventh computer readable program code means for causing the computer to generate said report listing said scores of said subset of pages.

18. The computer program product of claim 17, wherein said fifth computer readable program code means comprises:

seventh computer readable program code means for causing the computer to compile statistics from said pages;

eighth computer readable program code means for causing the computer to store said statistics; and ninth computer readable program code means for causing computer to analyze said statistics by combining said statistics, said pages and said additional information.

19. The computer program product of claim 18, further comprising tenth computer readable program code means for causing the computer to perform the seventh, eighth, and ninth computer readable program code for a plurality of entities.

* * * * *